(12) United States Patent
Huang

(10) Patent No.: US 11,733,018 B2
(45) Date of Patent: Aug. 22, 2023

(54) MEASURING DEVICE

(71) Applicant: Kuo-Hsuan Huang, Chiayi (TW)

(72) Inventor: Kuo-Hsuan Huang, Chiayi (TW)

( * ) Notice: Subject to any disclaimer, the term of this patent is extended or adjusted under 35 U.S.C. 154(b) by 653 days.

(21) Appl. No.: 16/825,791

(22) Filed: Mar. 20, 2020

(65) Prior Publication Data
US 2020/0300597 A1  Sep. 24, 2020

(30) Foreign Application Priority Data

Mar. 22, 2019 (TW) ................................ 108109927

(51) Int. Cl.
*G01B 5/00* (2006.01)
*G01B 5/30* (2006.01)

(52) U.S. Cl.
CPC .............. *G01B 5/0014* (2013.01); *G01B 5/30* (2013.01)

(58) Field of Classification Search
CPC .......... G01B 5/00; G01B 5/0014; G01B 5/30; G01B 7/16; G01B 7/18; G01B 9/02095; G01B 9/02096; G01B 21/32; B23Q 11/0003; B23Q 11/123; B23Q 17/0985
See application file for complete search history.

(56) References Cited

U.S. PATENT DOCUMENTS

| | | | | |
|---|---|---|---|---|
| 6,557,444 | B1 * | 5/2003 | Liao | ..................... F16H 63/067 82/143 |
| 2016/0282101 | A1 * | 9/2016 | Kaji | ........................ G01B 7/24 |

FOREIGN PATENT DOCUMENTS

SU   966569 A1 * 12/1980

* cited by examiner

*Primary Examiner* — Harshad R Patel
*Assistant Examiner* — Truong D Phan
(74) *Attorney, Agent, or Firm* — Muncy, Geissler, Olds & Lowe, P.C.

(57) ABSTRACT

A measuring device is adapted for measuring a change of linear dimension of a shaft body of a bearing device along an axis due to thermal expansion. The measuring device includes a stationary seat and a strain unit. The strain unit includes an actuator and a strain member. The actuator is adapted to be mounted to the shaft body, and is movable relative to the stationary seat along the axis as a result of the change of linear dimension of the shaft body. The strain member is deformable, is secured to the stationary seat and is connected to the actuator such that movement of the actuator along the axis results in a force applied to the strain member which deforms the strain member.

13 Claims, 14 Drawing Sheets

MEASURING DEVICE

CROSS-REFERENCE TO RELATED APPLICATION

This application claims priority of Taiwanese Patent Application No. 108109927, filed on Mar. 22, 2019.

FIELD

The disclosure relates to a measuring device, and more particularly to a measuring device for measuring a change of linear dimension of a shaft body.

BACKGROUND

In a conventional lathe manufacturing process, a workpiece is mounted to a rotary shaft of a lathe machine (e.g. a metal lathe machine). The rotary shaft is rotatably mounted to a shaft seat of the lathe machine, and is driven by electric power to rotate with the workpiece relative to the shaft seat such that various operations (e.g. cutting, sanding, drilling, etc.) may be performed on the workpiece.

During an operation, when the rotary shaft is running in high speed, friction between the rotary shaft and the shaft seat often causes the temperature of the rotary shaft to increase significantly, resulting in thermal expansion of the rotary shaft. Consequently, dimensional accuracy of a finished product may be affected by a change of linear dimension of the rotary shaft along its shaft axis due to the thermal expansion.

To recalibrate the rotary shaft, a conventional measuring device often used for measuring the change of linear dimension is a non-contact optical dilatometer. Once the linear dimension change is measured, a compensation can be made to improve accuracy of the operation. However, the non-contact optical dilatometer contributes to high manufacturing costs and thus, a comparable alternative with lower costs is highly anticipated.

SUMMARY

Therefore, the object of the disclosure is to provide a measuring device that can alleviate the drawback of the prior art.

According to the disclosure, a measuring device is adapted for measuring a change of linear dimension of a shaft body of a bearing device along an axis due to thermal expansion.

The measuring device includes a stationary seat and a strain unit. The strain unit includes an actuator and a strain member.

The actuator is adapted to be mounted to the shaft body, and is movable relative to the stationary seat along the axis as a result of the change of linear dimension of the shaft body.

The strain member is deformable, is secured to the stationary seat and is connected to the actuator such that movement of the actuator along the axis results in a force applied to the strain member which deforms the strain member.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
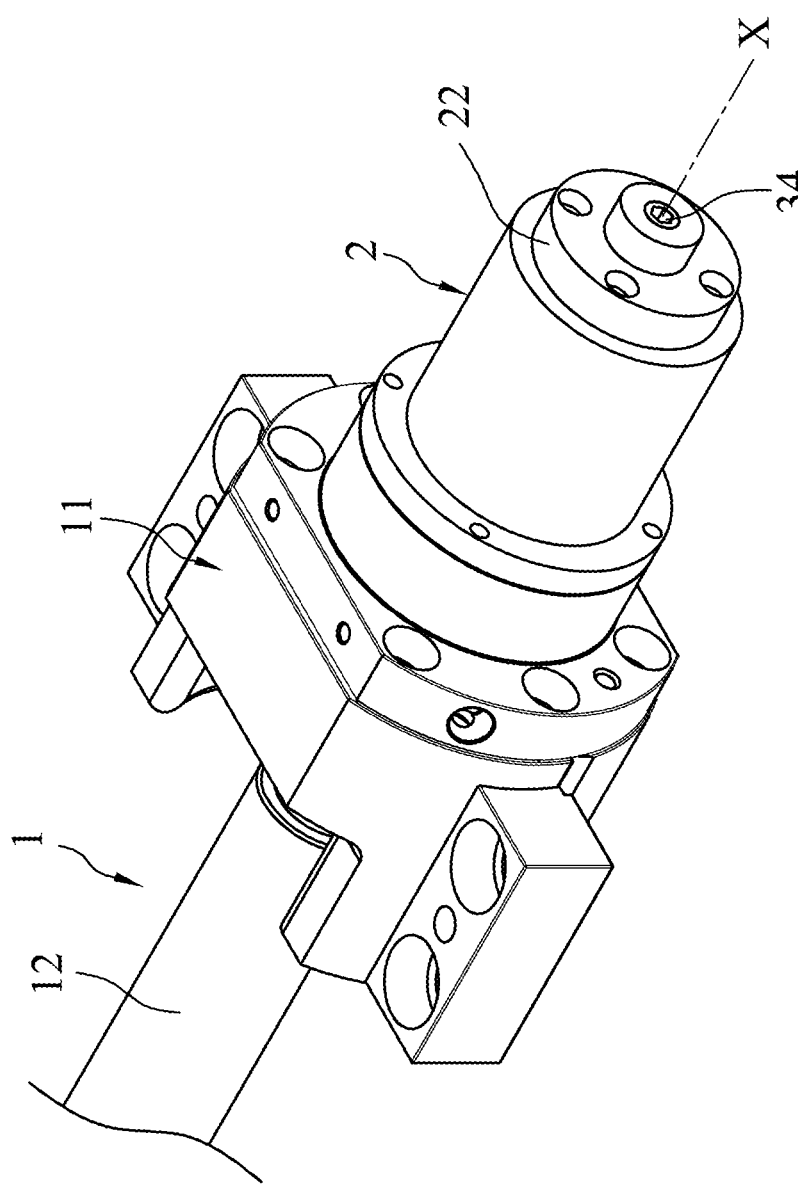
FIG. 1 is a fragmentary assembled perspective view of a first embodiment of a measuring device according to the disclosure mounted to a bearing device.

Before the present disclosure is described in greater detail, it should be noted that where considered appropriate, reference numerals or terminal portions of reference numerals have been repeated among the figures to indicate corresponding or analogous elements, which may optionally have similar characteristics.

Figure 2:
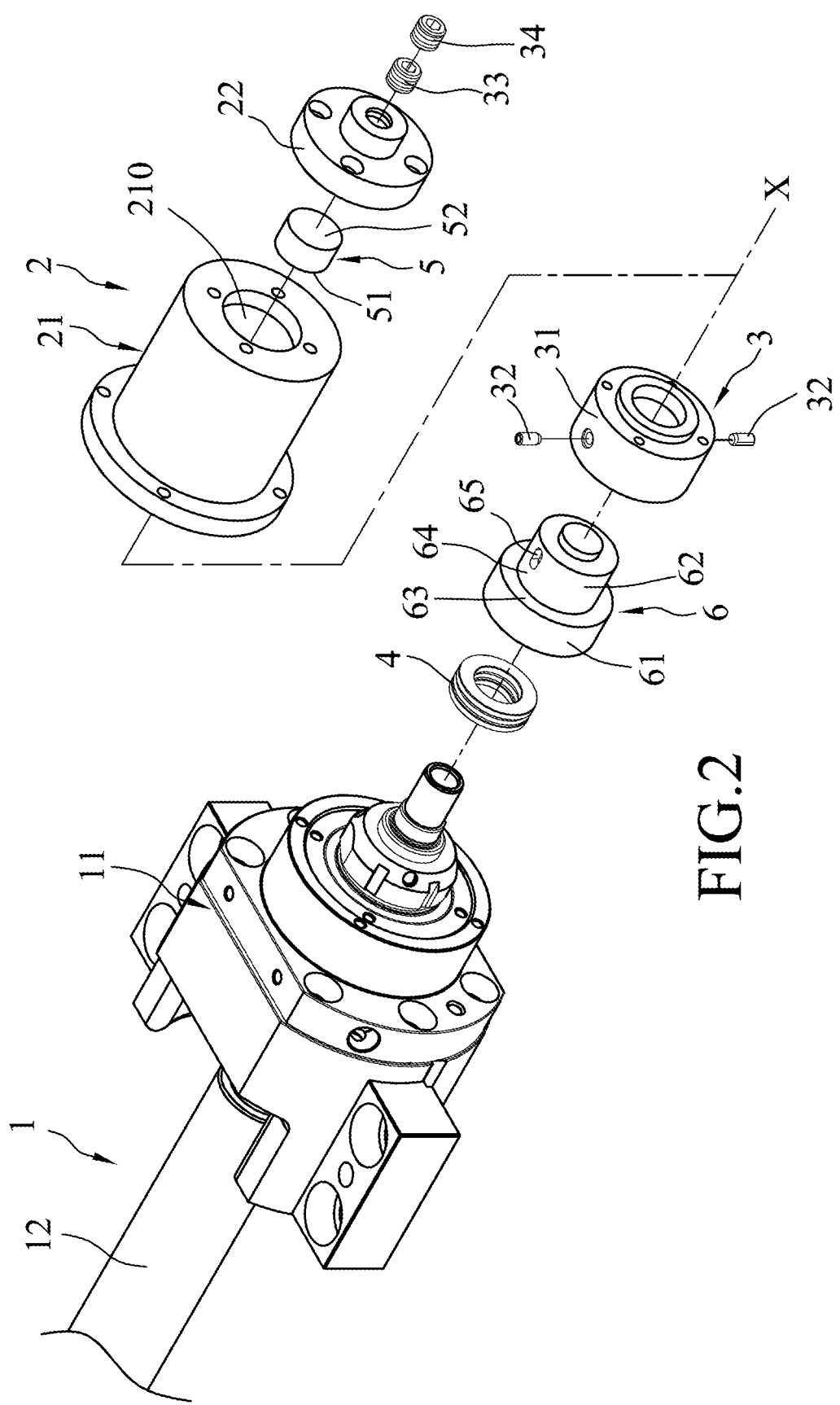
FIG. 2 is fragmentary partially exploded perspective view of the first embodiment and the bearing device.
Figure 3:
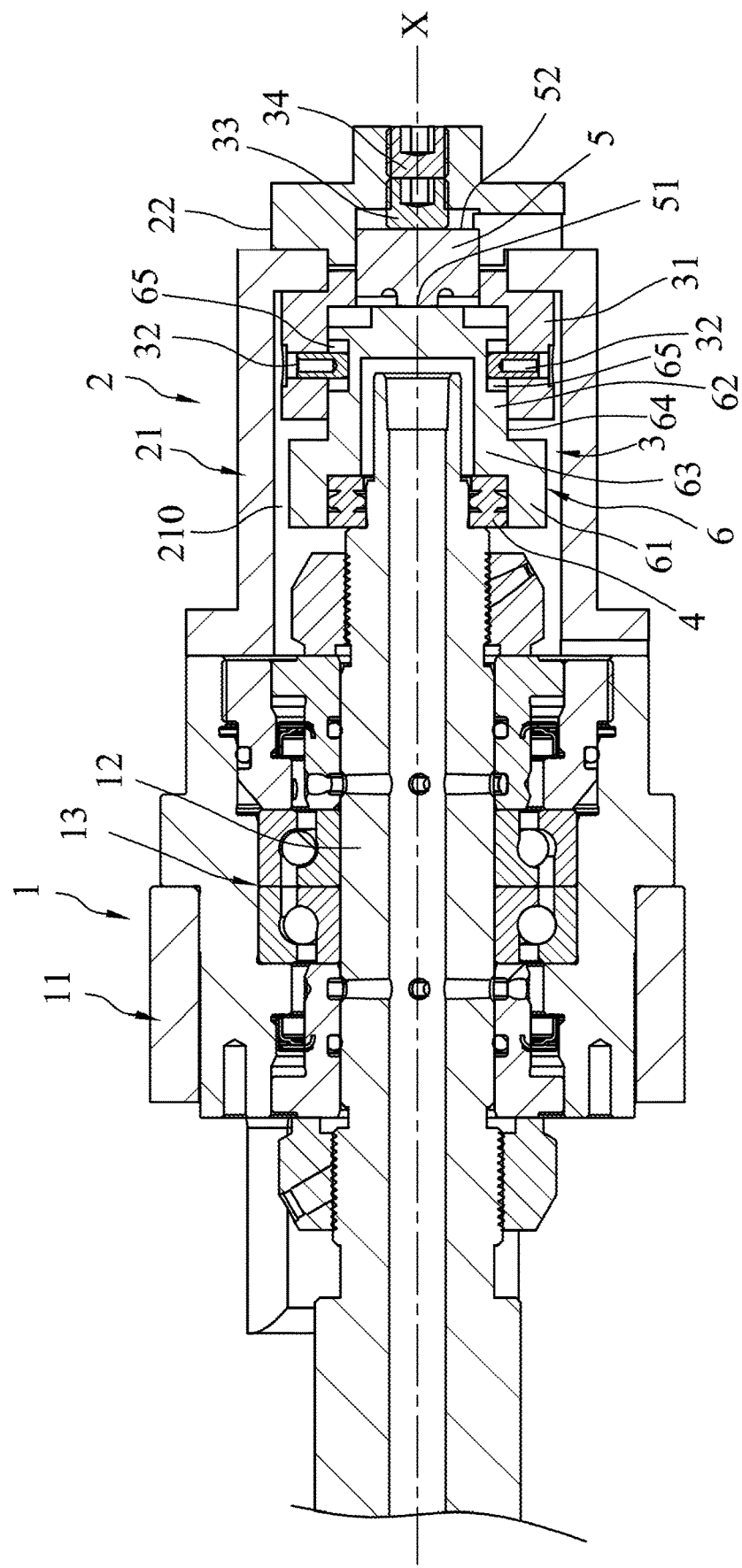
FIG. 3 is a fragmentary sectional view of the first embodiment and the bearing device.

Referring to FIGS. 1 to 3, a first embodiment of a measuring device according to the disclosure is adapted for use with a bearing device 1. The bearing device 1 includes a hollow base seat 11, a shaft body 12 and a bearing group 13. The shaft body 12 extends through the base seat 11 and is rotatable about an axis (X) relative to the base seat 11. The bearing group 13 is sleeved on the shaft body 12 and is mounted in the base seat 11.

Specifically, the measuring device is adapted for measuring a change of linear dimension of the shaft body 12 along the axis (X) due to thermal expansion. The measuring device includes a stationary seat 2 and a strain unit 3.

The stationary seat 2 is adapted to be fixedly mounted to the bearing device 1, and includes a first seat body 21 and a second seat body 22. The first seat body 21 is screwed to the base seat 11 of the bearing device 1, and defines an installation space 210 that extends along the axis (X). The second seat body 22 is fixed to the first seat body 21, and is provided with an internal thread.

The strain unit 3 includes an actuator 4, a strain member 5 and a transmitting member 6.

The actuator 4 is adapted to be mounted to the shaft body 12, is disposed in the installation space 210, and is movable relative to the stationary seat 2 along the axis (X) as a result of the change of linear dimension of the shaft body 12. In the present embodiment, the actuator 4 is a thrust bearing and is sleeved on the shaft body 12.

The strain member 5 is deformable, is secured to the stationary seat 2, and is connected to the actuator 4 via the transmitting member 6, such that movement of the actuator 4 along the axis (X) results in a force applied to the strain member 5 which deforms the strain member 5.

Specifically, the strain member 5 is fixedly mounted between the transmitting member 6 and the second seat body 22 of the stationary seat 2, and has a first face 51 that faces the transmitting member 6, and a second face 52 that is opposite to the first face 51. In the present embodiment, the strain member 5 is a strain gauge made of a conductive material. However, the strain member 5 may also be a piezoelectric sensor made of a piezoelectric material, or a linear variable differential transformer (LVDT), which is a type of electrical transformer used for measuring linear displacement, depending on actual needs.

The transmitting member 6 is connected between the actuator 4 and the strain member 5 and is co-movable with the actuator 4, such that the movement of the actuator 4 drives the transmitting member 6 to push against the strain member 5, resulting in the force applied to the strain member 5.

Specifically, the transmitting member 6 has a large diameter portion 61, a small diameter portion 62, and a shoulder portion 63.

The large diameter portion 61 surrounds the actuator 4. The small diameter portion 62 is disposed between the large diameter portion 61 and the strain member 5. The shoulder portion 63 interconnects the large and small diameter portions 61, 62, and the actuator 4 abuts against the shoulder portion 63 of the transmitting member 6. Each of the large diameter, small diameter and shoulder portions 61, 62, 63 has an outer surface, and those three outer surfaces cooperatively form an outer surface 64 of the transmitting member 6. The outer surface 64 surrounds the axis (X), and is formed with two slide grooves 65 which are spaced apart from each other. Specifically, the slide grooves 65 are formed in the small diameter portion 62 of the transmitting member 6.

The strain unit 3 further includes a guide sleeve 31, two retaining pins 32, a first threaded member 33 and a second threaded member 34.

The guide sleeve 31 surrounds the small diameter portion 62 of the transmitting member 6 and a portion of the strain member 5, and is disposed in and connected fixedly to the first seat body 21 of the stationary seat 2. The retaining pins 32 are spaced apart from each other, are connected fixedly to the guide sleeve 32, and extend transversely and respectively into the slide grooves 65 of the transmitting member 6. A diameter of each of the retaining pins 32 is smaller than a length of each of the slide grooves 65 in a direction of the axis (X), such that movement of the transmitting member 6 along the axis (X) is guided and restricted by the retaining pins 32. It should be noted that numbers of the retaining pins 32 and the slide grooves 65 are not limited to two; in variations of the present embodiment, there may be only one retaining pin 32 and one slide groove 65.

The first threaded member 33 is disposed in the second seat body 22, threadedly engages the internal thread of the second seat body 22, and abuts against the second face 52 of the strain member 5. In a similar manner, the second threaded member 34 is also disposed in the second seat body 22, threadedly engages the internal thread of the second seat body 22, and abuts against the first threaded member 33 opposite to the second face 52 of the strain member 5.

By virtue of the abovementioned configuration, the strain member 5 is pressed by the first and second threaded member 33, 34 against the transmitting member 6, with a predetermined force. Thus, a predetermined strain of the strain member 5 can be detected and measured as a reference value prior to an operation, where there are no change of linear dimension of the shaft body 12.

During the operation, after the shaft body 12 of the bearing device 1 has been rotating for a period of time, the shaft body 12 of the bearing device 1 starts to expand in response to a change in temperature. The actuator 4, which moved along the axis (X) as a result of the change of linear dimension of the shaft body 12, drives the transmitting member 6 to push against and deform the strain member 5 (i.e., in the form of compression in the present embodiment). As a result, an electrical resistance of the strain member 5 is changed, and an electrical signal (e.g., voltage) corresponding to such change of electrical resistance can be measured.

It should be noted that, the strain member 5 may be electrically connected to a central control unit (e.g., a computer), such that the linear dimensional change of the shaft body 12 can be obtained after analyzing and processing the electrical signal. Alternatively, a database that compiles correspondence between numerical values of the electric signals and linear dimensional changes of the shaft body 12 can be established first, so that when a certain electrical signal is measured, the corresponding value of the linear dimensional change can be obtained by simply referring to the database. In addition, the strain member 5 may also be electrically connected to a cooling system. When the electrical signal output by the strain member 5 reaches a threshold value, which indicates that the shaft body 12 is experiencing a significant temperature increase (the higher the temperature, the greater the linear dimensional change), the cooling system is triggered, so that cooling water is injected into the bearing device 1 to lower the temperature. Furthermore, the electrical signals can be further used as compensation references for recalibrating the bearing device 1 to improve accuracy of the operation.

Figure 4:
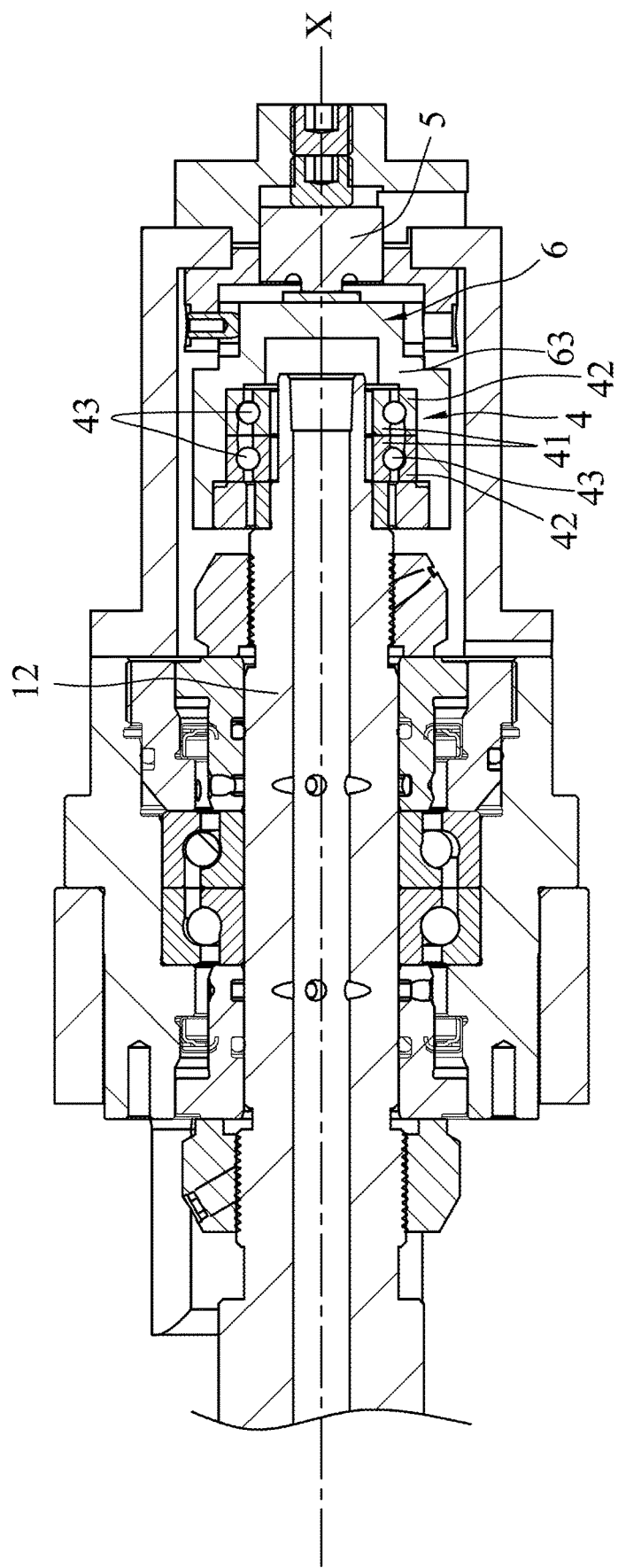
FIG. 4 is a view similar to FIG. 3, yet illustrating a second embodiment of the measuring device according to the disclosure.
Figure 5:
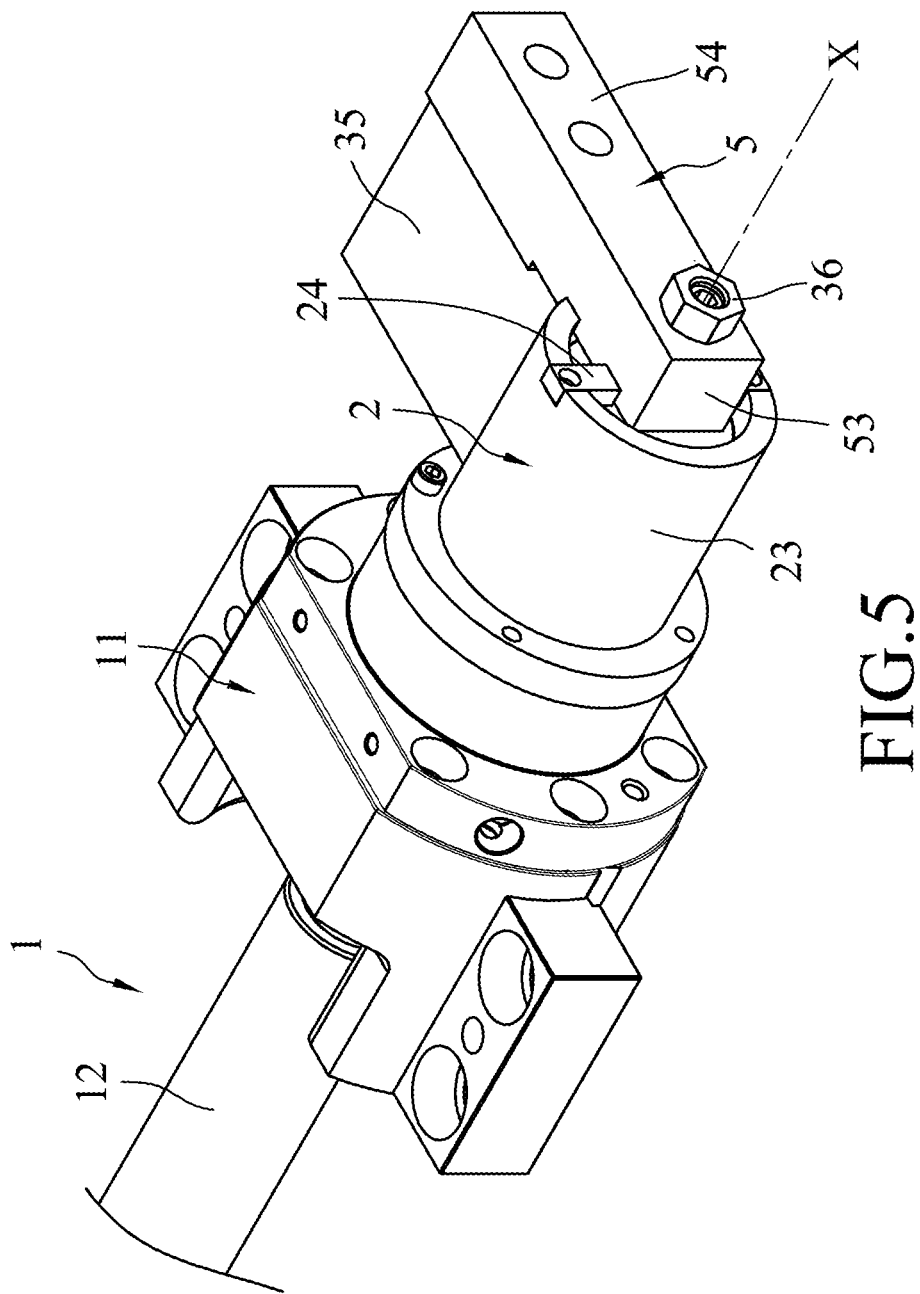
FIG. 5 is a fragmentary assembled perspective view of a third embodiment of the measuring device according to the disclosure mounted to a bearing device.
Figure 6:
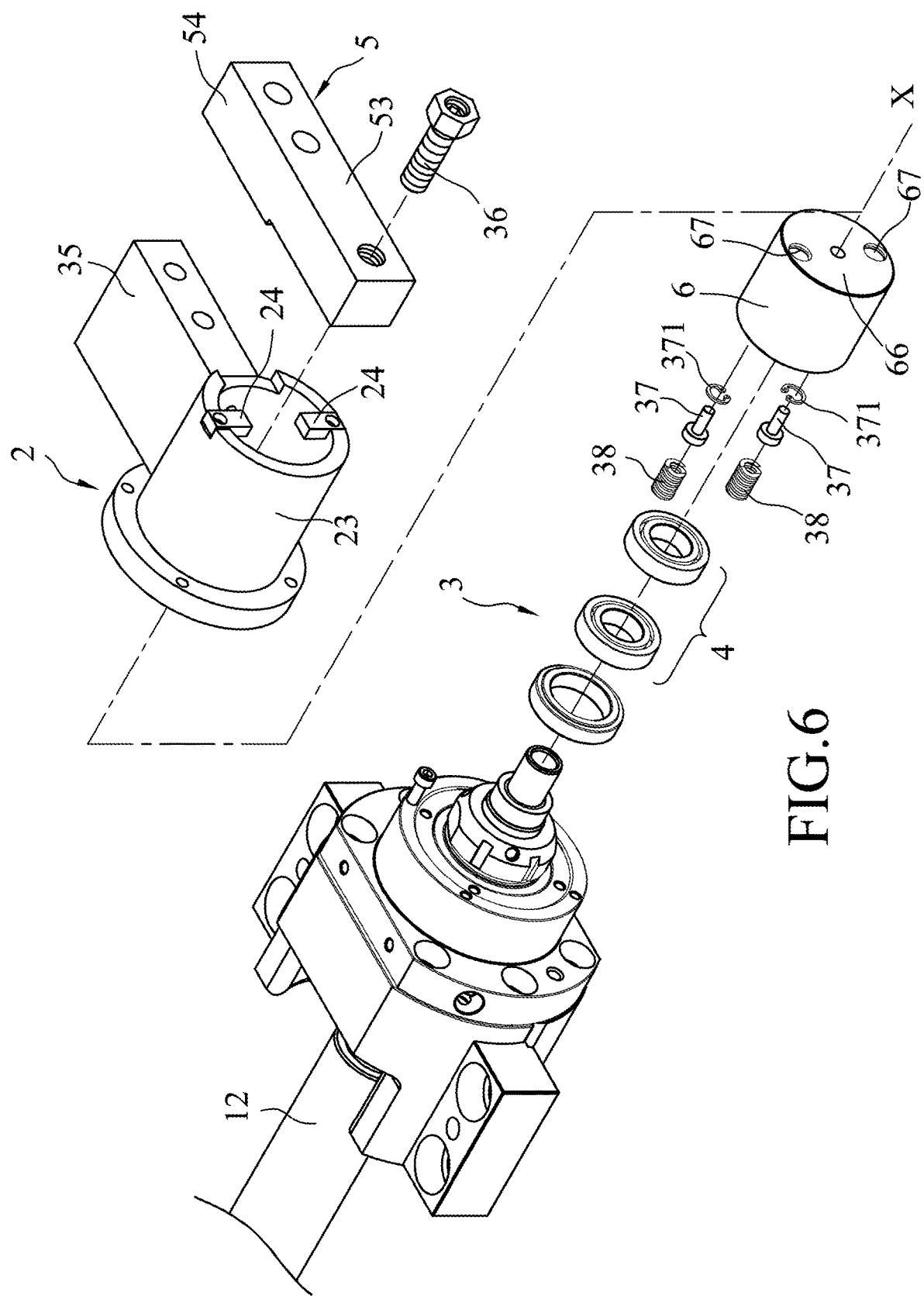
FIG. 6 is fragmentary partially exploded perspective view of the third embodiment and the bearing device.
Figure 7:
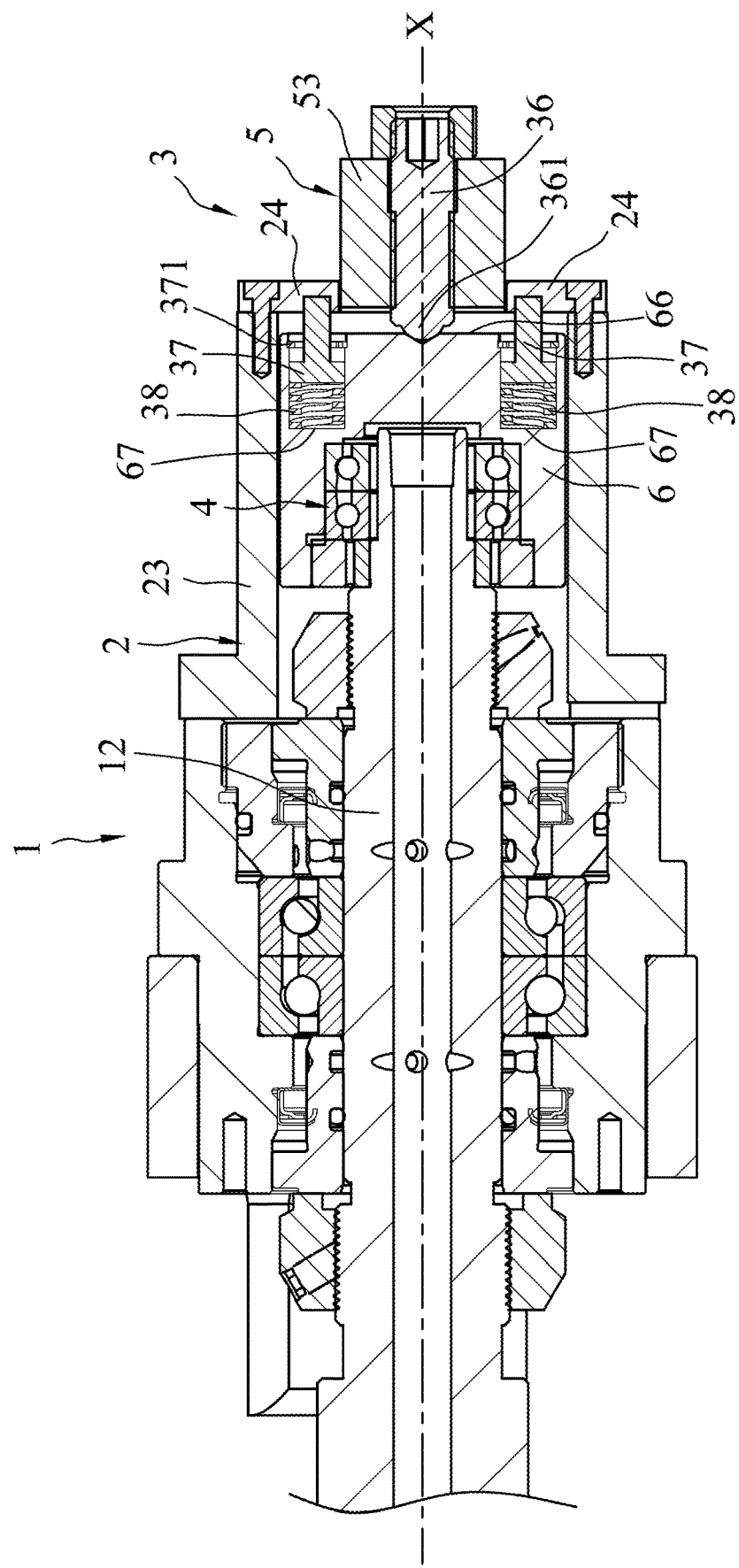
FIG. 7 is a fragmentary sectional view of the third embodiment and the bearing device.

Referring to FIG. 4, a second embodiment of the measuring device according to the disclosure is similar to the first embodiment. The difference between the two embodiments resides in that, in the second embodiment, the actuator 4 includes two angular contact ball bearings, each of which includes an inner ring seat 41, an outer ring seat 42, and a plurality of bearing balls 43 (only one is visible in FIG. 4) that are disposed between the inner and outer ring seats 41, 42. When the shaft body 12 expands, the inner ring seats 41 of the angular contact ball bearings are moved, driving the outer ring seats 42 of the angular contact ball bearings to move therealong via the bearing balls 43 of the angular contact ball bearings, and to push against the shoulder portion 63 of the transmitting member 6.

Referring to FIGS. 5 to 8, a third embodiment of the measuring device according to the disclosure is similar to the first embodiment. The differences between the two embodiments reside in that, in the third embodiment, the configuration of the stationary seat 2 is slightly different; the strain unit 3 further includes a support block 35, a threaded rod 36, two spring pins 37 and two springs 38; and the strain member 5 has a deflecting portion 53 and a linking portion 54. In addition, in the present embodiment, the actuator 4 includes two ball bearings, which are the same as in the second embodiment.

Specifically, the stationary seat 2 in the present embodiment includes a surrounding wall 23 and two positioning walls 24. The surrounding wall 23 is screwed to the base seat 11 of the bearing device 1, and surrounds and extends along the axis (X). The positioning walls 24 are spaced apart from each other, and are connected to an end of the surrounding wall 23 opposite to the base seat 11.

Figure 8:
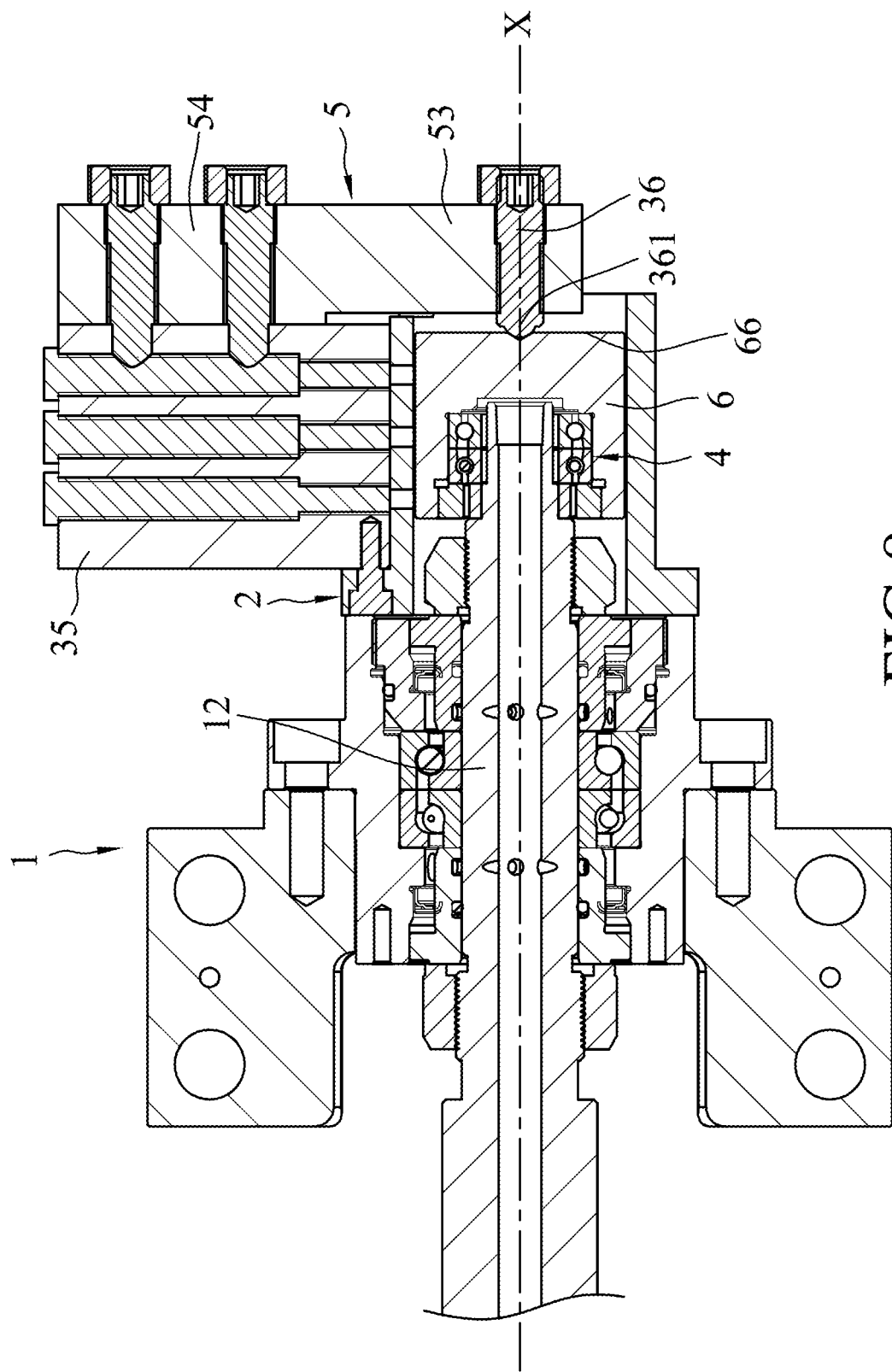
FIG. 8 is another fragmentary sectional view of the third embodiment and the bearing device.

The support block 35 is secured to an outer surface of the surrounding wall 23 via screws (see FIG. 8). The deflecting portion 53 of the strain member 5 is disposed at the end of the surrounding wall 23, but is not fixed thereto. The linking portion 54 of the strain member 5 extends from the deflecting portion 53 and is fixed to the support block 35 via screws (see FIG. 8). The threaded rod 36 threadedly extends through the deflecting portion 53 of the strain member 5 in a direction of the axis (X), and has a press end 361 abutting against the transmitting member 6. A central axis of the threaded rod 36 coincides with the axis (X) (i.e., a central axis of the shaft body 12). The springs 38 are disposed between the transmitting member 6 and the stationary seat 2 for biasing the transmitting member 6 away from the stationary seat 2, and for stabilizing movement of the transmitting member 6.

In virtue of such configuration, the deflecting portion 53 of the strain member 5 is deflectable relative to the linking portion 54, and the movement of the actuator 4 drives the transmitting member 6 to push the deflecting portion 53 via the threaded rod 36. That is, deformation of the strain member 5 in the present embodiment (i.e., deflection) is different than that in the previous embodiments (i.e., compression), but still serves the purpose of measuring the change of linear dimension of the shaft body 12.

Specifically, in the present embodiment, the transmitting member 6 has a push face 66 and two receiving grooves 67. The push face 66 faces the strain member 5, and the receiving grooves 67 are spaced apart from each other, and extend from the push face 66 into the transmitting member 6. The spring pins 37 are received respectively in the receiving grooves 67, and are connected respectively to the positioning walls 24 of the stationary seat 2. Two circlips (i.e., C-clips) 371 are provided to be respectively secured to the spring pins 37, which prevent the spring pins 37 from falling out of the receiving grooves 67 during assembling. The springs 38 are received respectively in the receiving grooves 67, each having opposite ends that abut respectively against a respective one of the spring pins 37 and the transmitting member 6, so that once the operation has been completed, the springs 38 are able to bias the transmitting member 6 back to its original position prior to the operation, which helps in securing connection between the transmitting member 6 and the actuator 4.

Figure 9:
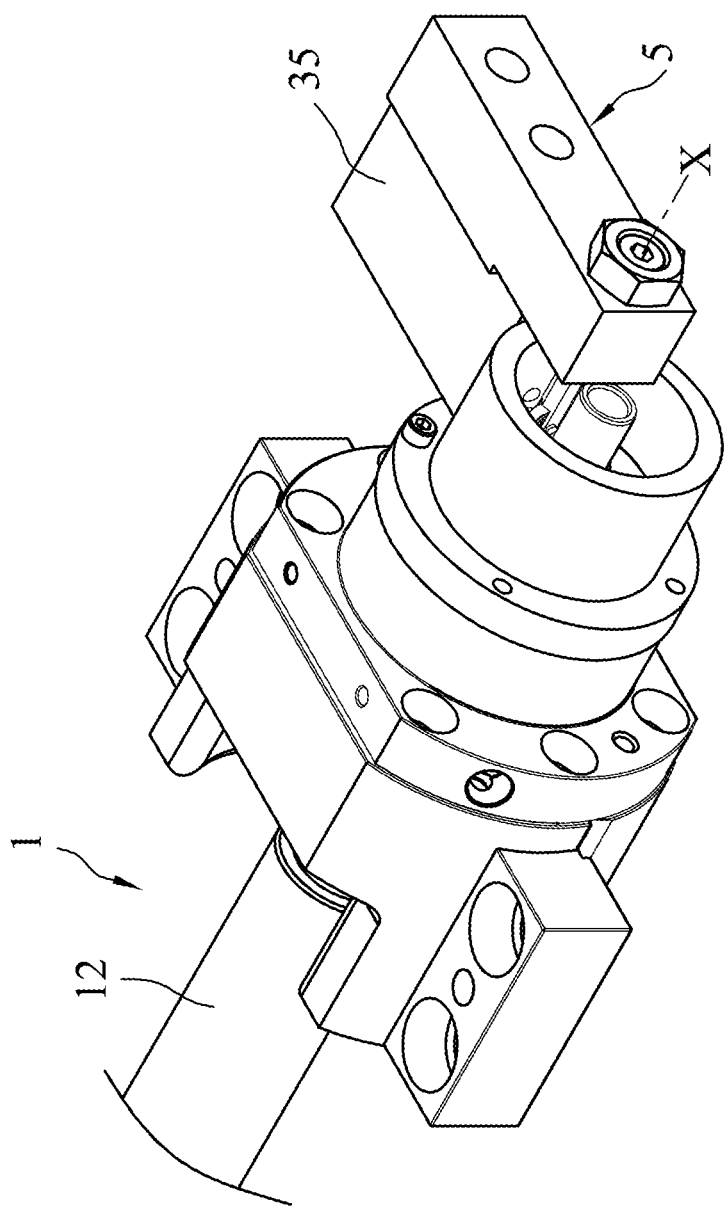
FIG. 9 is a fragmentary assembled perspective view of a fourth embodiment of the measuring device according to the disclosure mounted to the bearing device.
Figure 10:
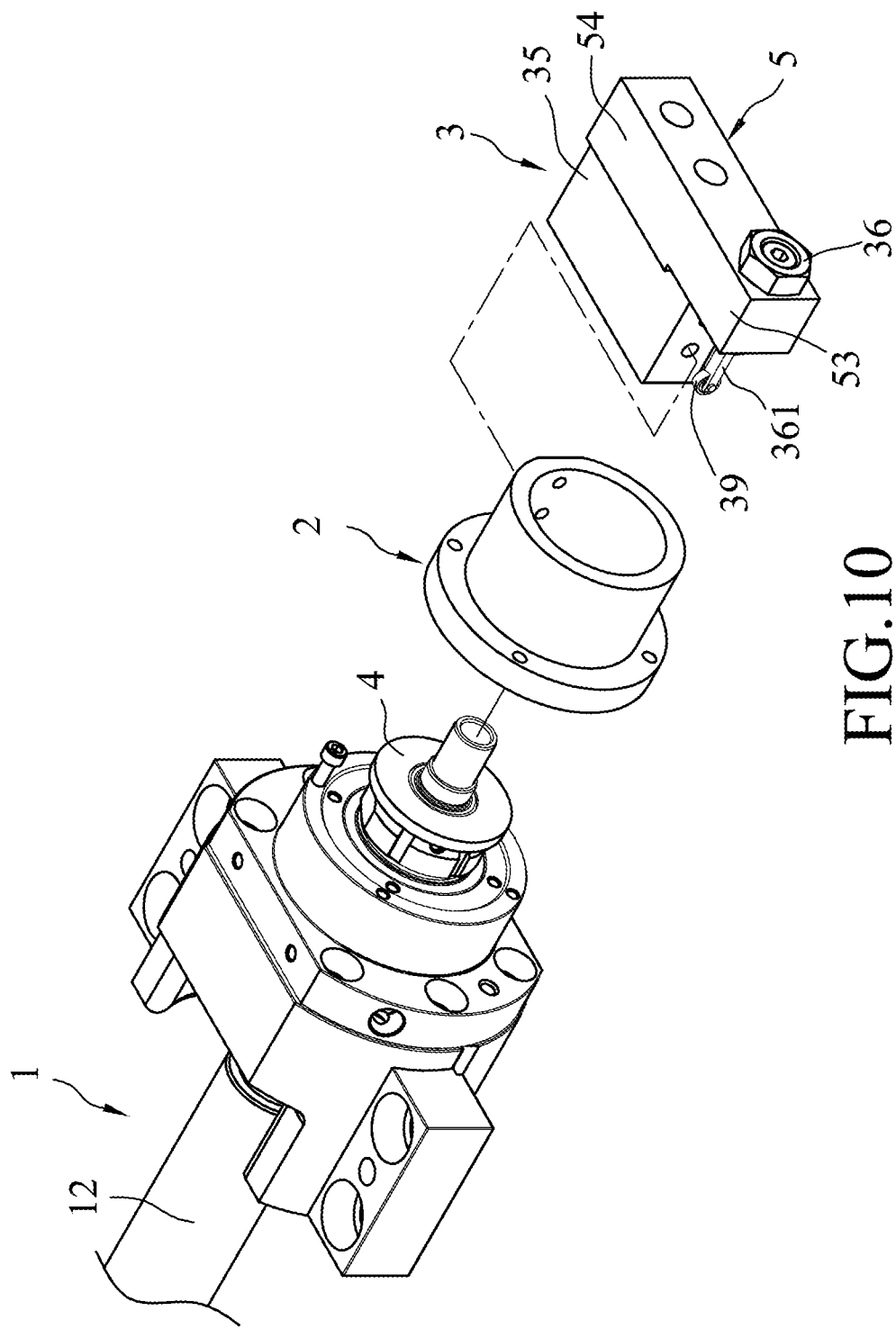
FIG. 10 is a fragmentary partially exploded perspective view of the fourth embodiment and the bearing device.
Figure 11:
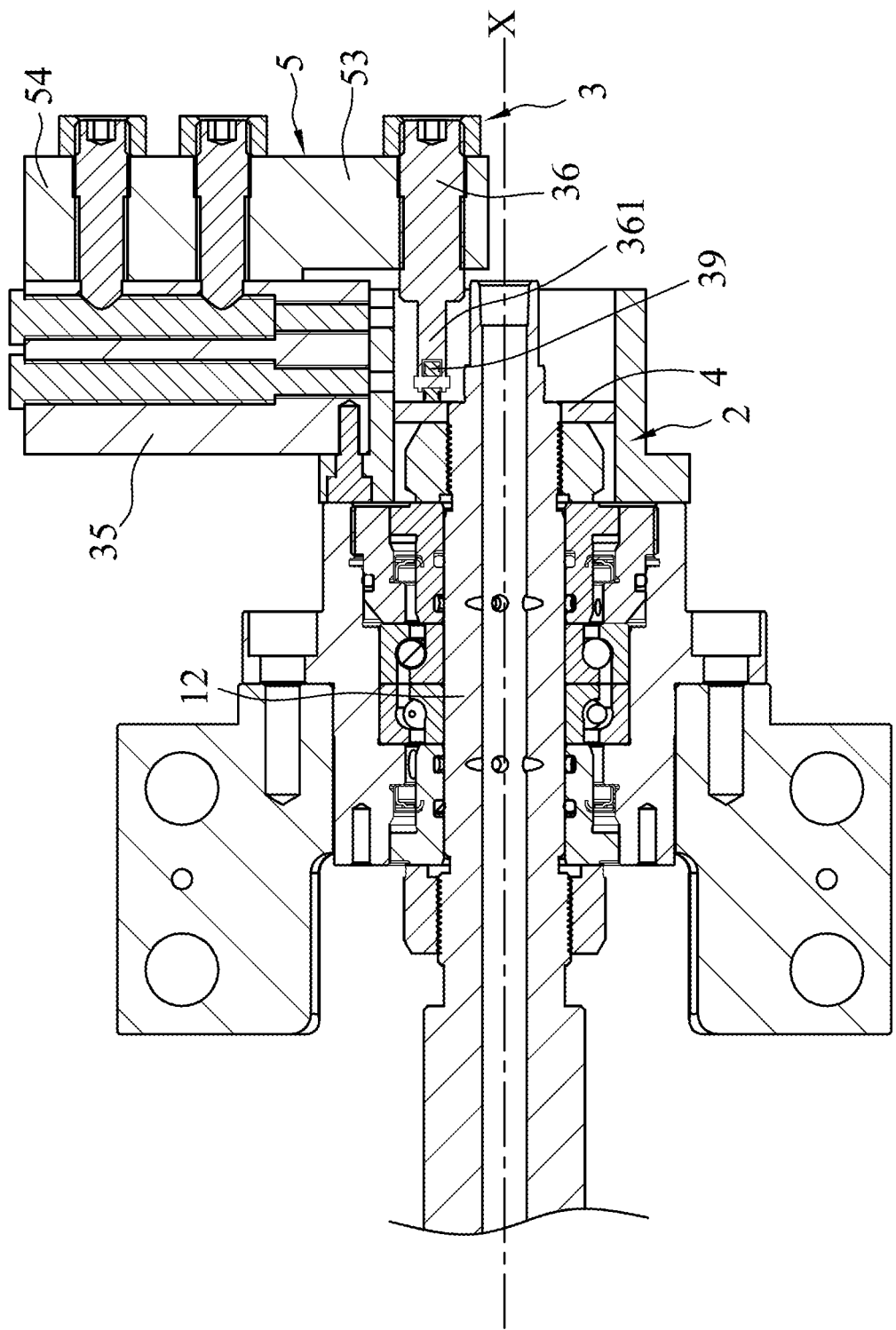
FIG. 11 is a fragmentary sectional view of the fourth embodiment and the bearing device.

Referring to FIGS. 9 to 11, a fourth embodiment of the measuring device according to the disclosure is similar to the third embodiment. The differences between the two embodiments reside in that, in the present embodiment, the actuator 4 includes a round plate washer that is sleeved on the shaft body 12, and the strain unit 3 further includes a rolling wheel 39 that is connected to the press end 361 of the threaded rod 36 and that is in contact with the actuator 4. The central axis of the threaded rod 36 is parallel to, but not coincides with, the axis (X).

When the shaft body 12 expands, the actuator 4 moves along the axis (X) and presses against the rolling wheel 39, and deflects the strain member 5 via the rolling wheel 39 and the threaded rod 36, resulting in a bending strain corresponding to the linear dimensional change of the shaft body 12.

Figure 12:
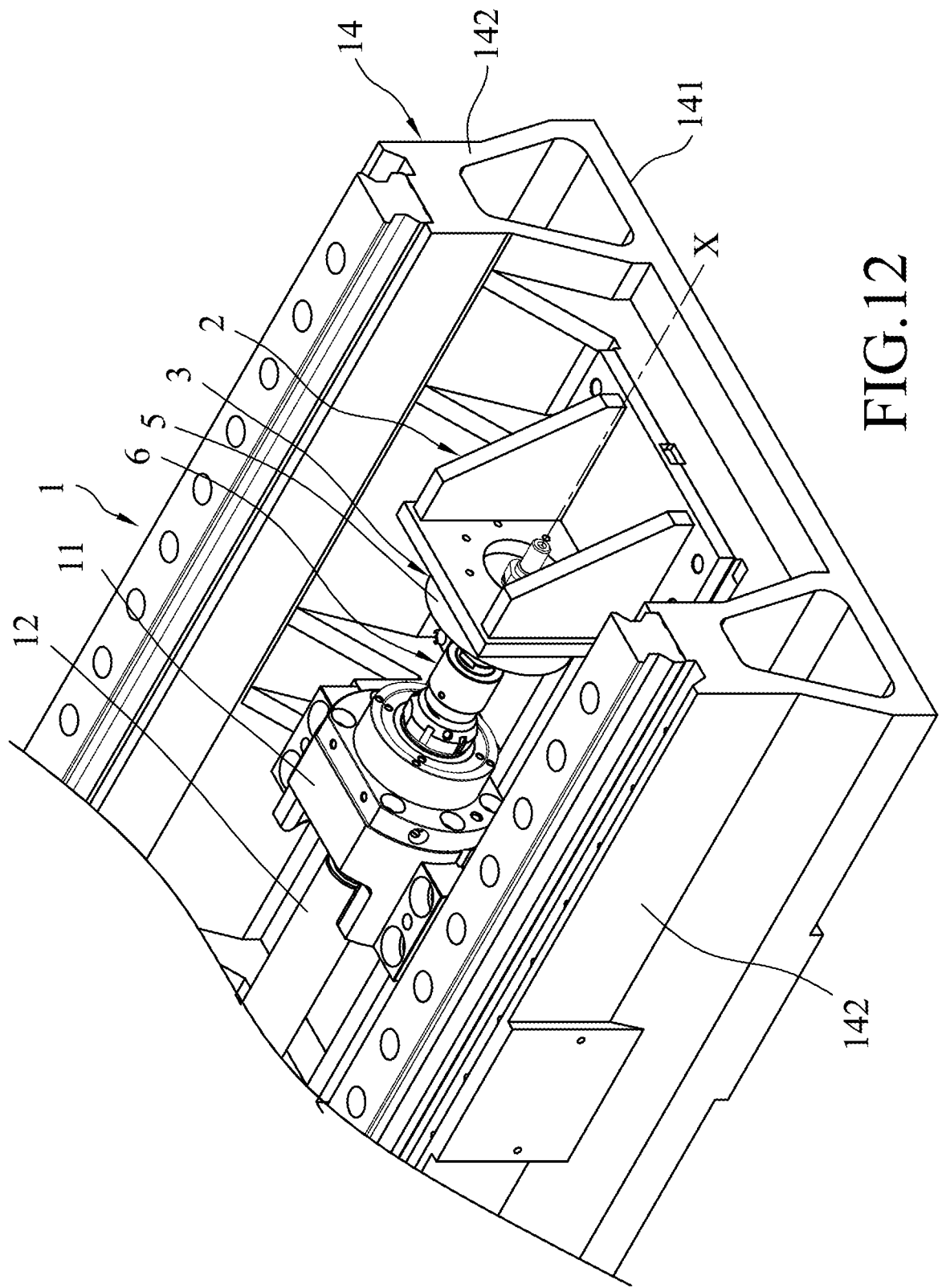
FIG. 12 is a fragmentary assembled perspective view of a fifth embodiment of the measuring device according to the disclosure mounted to the bearing device.
Figure 13:
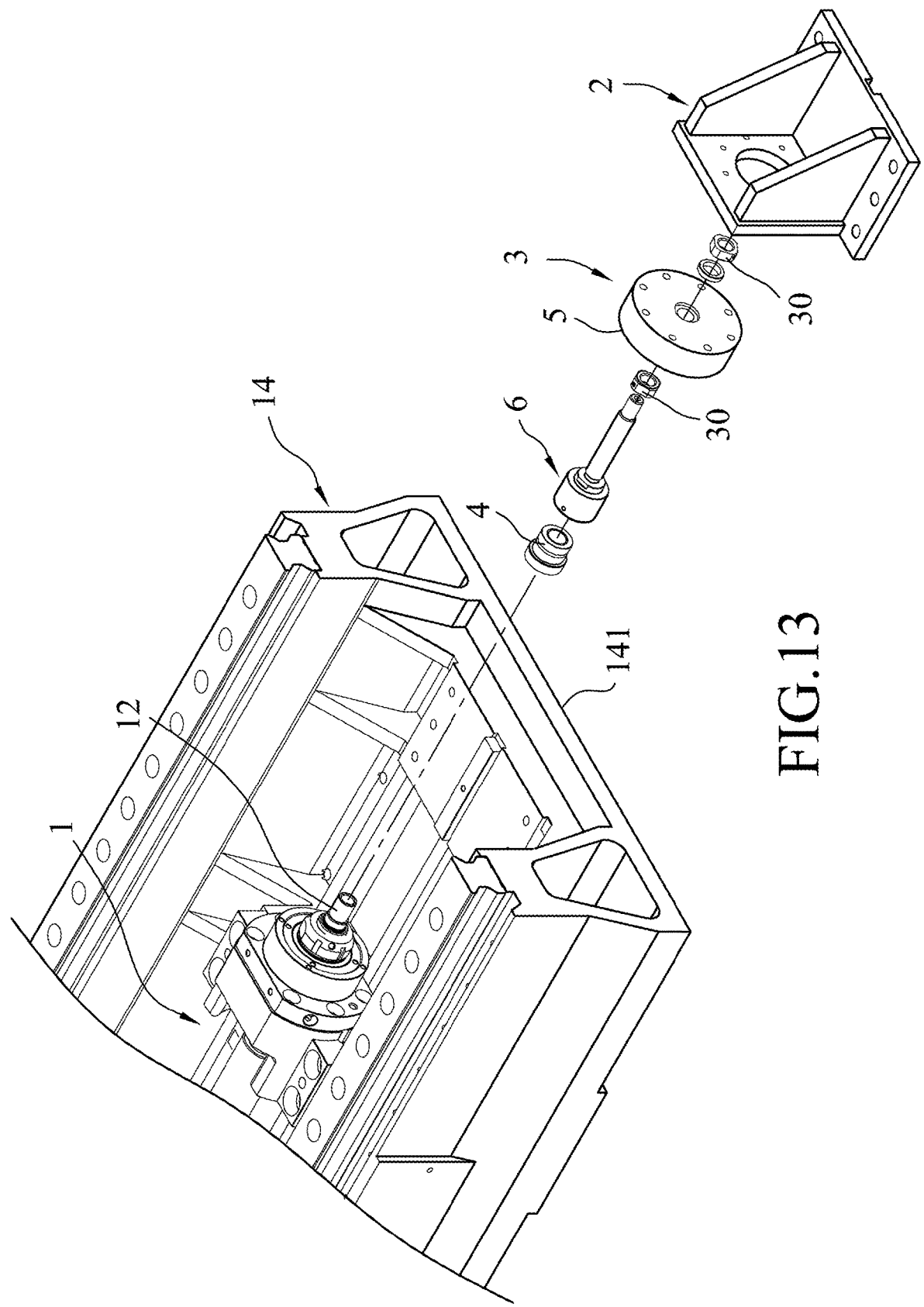
FIG. 13 is a fragmentary partially exploded perspective view of the fifth embodiment and the bearing device.
Figure 14:
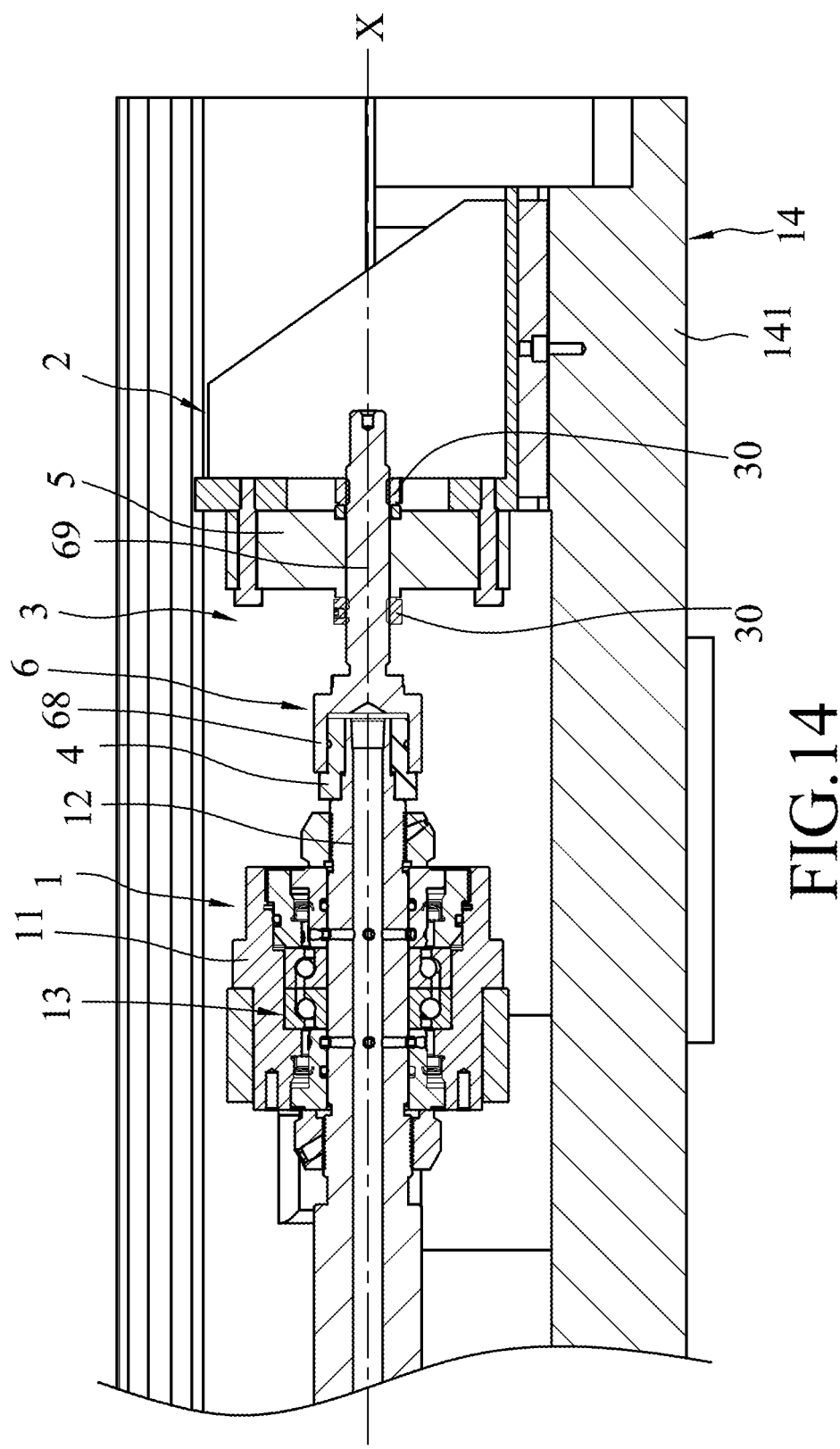
FIG. 14 is a fragmentary sectional view of the fifth embodiment and the bearing device.

Referring to FIGS. 12 to 14, a fifth embodiment of the measuring device according to the disclosure is similar to the first embodiment. The differences between the two embodiments are described as follows.

In the present embodiment, the bearing device 1 further includes a bottom seat 14. The bottom seat 14 includes a horizontal bottom wall 141, and two side walls 142 that extend respectively and upwardly from two opposite lateral sides of the bottom wall 141. The base seat 11, the shaft body 12 and the bearing group 13 are disposed in a receiving space defined cooperatively by the bottom and side walls 141, 142 of the bottom seat 14.

The stationary seat 2 is adapted to be spaced apart from the shaft body 12 along the axis (X), and is adapted to be fixed to the bottom wall 141 of the bottom seat 14 via screws (see FIG. 14). The strain unit 3 includes the actuator 4, the strain member 5 and the transmitting member 6, and further includes two fastening members 30.

The actuator 4 is adapted to be mounted to an end portion of the shaft body 12 that is proximate to the stationary seat 2, and includes a combined type needle roller bearing, which is a combination of a thrust ball bearing and a needle roller bearing. The strain member 5 is mounted to a surface of the stationary seat 2 that faces the actuator 4 via screws (see FIG. 14).

The transmitting member 6 has a coupling portion 68 coupled to the actuator 4, and a rod portion 69 extending from the coupling portion 68 along the axis (X) through the strain member 5. The fastening members 30 are configured as nuts engaged with the rod portion 69 of the transmitting member 6, and abut against opposite ends of the strain member 5 such that the fastening members 30 apply a predetermined force onto the strain member 5.

In virtue of such configuration, the rod portion 69 of the transmitting member 6 is fixed to the strain member 5 such that the change of linear dimension of the shaft body 12 drives the actuator 4 to push the coupling portion 68 of the transmitting member 6 along the axis (X), thereby resulting in the force applied to deform the strain member 5.

In sum, the measuring device of the present disclosure is able to measure the change of linear dimension of the shaft body 12 via the strain member 5 in a contacting manner, providing an alternative to the non-contact optical dilatometer of the prior art with lower costs.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A measuring device adapted for measuring a change of linear dimension of a shaft body of a bearing device along an axis due to thermal expansion, said measuring device comprising:
   a stationary seat; and
   a strain unit that includes
      an actuator adapted to be mounted to the shaft body, and being movable relative to said stationary seat along the axis as a result of the change of linear dimension of the shaft body, and
      a strain member being deformable, being secured to said stationary seat and being connected to said actuator such that movement of said actuator along the axis results in a force applied to said strain member which deforms said strain member.

2. The measuring device as claimed in claim 1, wherein:
   said stationary seat is adapted to be fixedly mounted to the bearing device, and defines an installation space that extends along the axis; and
   said actuator is disposed in said installation space.

3. The measuring device as claimed in claim 2, wherein said strain unit further includes a transmitting member that is connected between said actuator and said strain member and that is co-movable with said actuator, such that the movement of said actuator drives said transmitting member to push against said strain member, resulting in the force applied to said strain member.

4. The measuring device as claimed in claim 3, wherein:
   said transmitting member has an outer surface that surrounds the axis and that is formed with a slide groove;
   said strain unit further includes a guide sleeve that surrounds said transmitting member and that is connected fixedly to said stationary seat, and a retaining pin that is connected fixedly to said guide sleeve and that extends transversely into said slide groove of said transmitting member; and
   a diameter of said retaining pin is smaller than a length of said slide groove in a direction of the axis, such that movement of said transmitting member along the axis is restricted by said retaining pin.

5. The measuring device as claimed in claim 4, wherein:
   said stationary seat includes a first seat body that defines said installation space and a second seat body that is fixed to said first seat body and that is provided with an internal thread;
   said strain member is fixedly mounted between said transmitting member and said second seat body, and has a first face that faces said transmitting member, and a second face that is opposite to said first face; and
   said strain unit further includes a first threaded member that is disposed in said second seat body, that threadedly engages said internal thread of said second seat body, and that abuts against said second face.

6. The measuring device as claimed in claim 4, wherein said transmitting member has:
   a large diameter portion that surrounds said actuator;
   a small diameter portion that is disposed between said large diameter portion and said strain member; and
   a shoulder portion that interconnects said large and small diameter portions, an outer surface of said shoulder portion cooperating with outer surfaces of said large and small diameter portions to form said outer surface of said transmitting member;

said actuator abuts against said shoulder portion of said transmitting member; and
said slide groove is formed in said small diameter portion of said transmitting member.

7. The measuring device as claimed in claim 3, wherein:
   said strain unit further includes
      a support block that is secured to an outer surface of said stationary seat, and
      a threaded rod that threadedly extends through said strain member in a direction of the axis, and that has a press end abutting against said transmitting member; and
   said strain member has
      a deflecting portion, said threaded rod threadedly extending through said deflecting portion, and
      a linking portion that extends from said deflecting portion and that is fixed to said support block such that said deflecting portion is deflectable relative to said linking portion and that the movement of said actuator drives said transmitting member to push said deflecting portion of said strain member via said threaded rod.

8. The measuring device as claimed in claim 7, wherein said strain unit further includes a spring that is disposed between said transmitting member and said stationary seat for biasing said transmitting member away from said stationary seat, and for stabilizing movement of said transmitting member.

9. The measuring device as claimed in claim 2, wherein said actuator includes one of a thrust bearing, a ball bearing and an angular contact bearing.

10. The measuring device as claimed in claim 2, wherein:
    said strain unit further includes
       a support block that is secured to an outer surface of said stationary seat, and
       a threaded rod that threadedly extends through said strain member in a direction of the axis, and that has a press end abutting against said transmitting member;
    said strain member has
       a deflecting portion, said threaded rod threadedly extending through said deflecting portion, and
       a linking portion that extends from said deflecting portion and that is fixed to said support block such that said deflecting portion is deflectable relative to said linking portion and that the movement of said actuator drives said transmitting member to push said deflecting portion of said strain member via said threaded rod; and
    said actuator includes a round plate washer that is sleeved on the shaft body, and said strain unit further includes a rolling wheel that is connected to said press end of said threaded rod and that is in contact with said actuator.

11. The measuring device as claimed in claim 1, wherein:
    said stationary seat is adapted to be spaced apart from the shaft body along the axis;
    said actuator is adapted to be mounted to an end portion of the shaft body that is proximate to said stationary seat; and
    said strain member is mounted to a surface of said stationary seat that faces said actuator.

12. The measuring device as claimed in claim 11, wherein:
    said strain unit further includes a transmitting member that has a coupling portion coupled to said actuator, and a rod portion extending from said coupling portion along the axis through said strain member; and said rod portion of said transmitting member is fixed to said strain member such that the change of linear dimension of the shaft body drives said actuator to push said coupling portion of said transmitting member along the axis, thereby resulting in the force applied to said strain member.

13. The measuring device as claimed in claim 11, wherein said actuator includes a combined type needle roller bearing.

\* \* \* \* \*